April 5, 1927. 1,623,413
H. S. JANDUS ET AL
BUMPER
Filed July 1, 1926 2 Sheets-Sheet 1
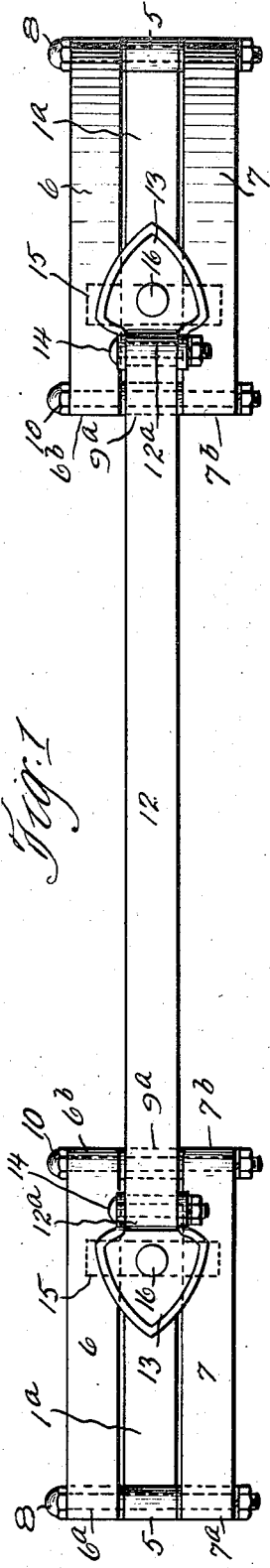
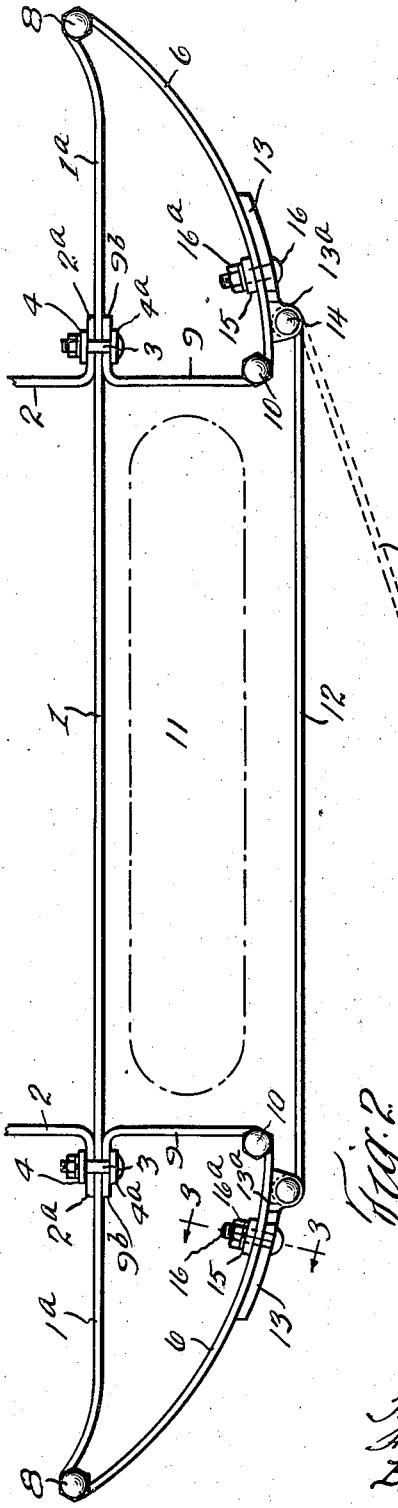
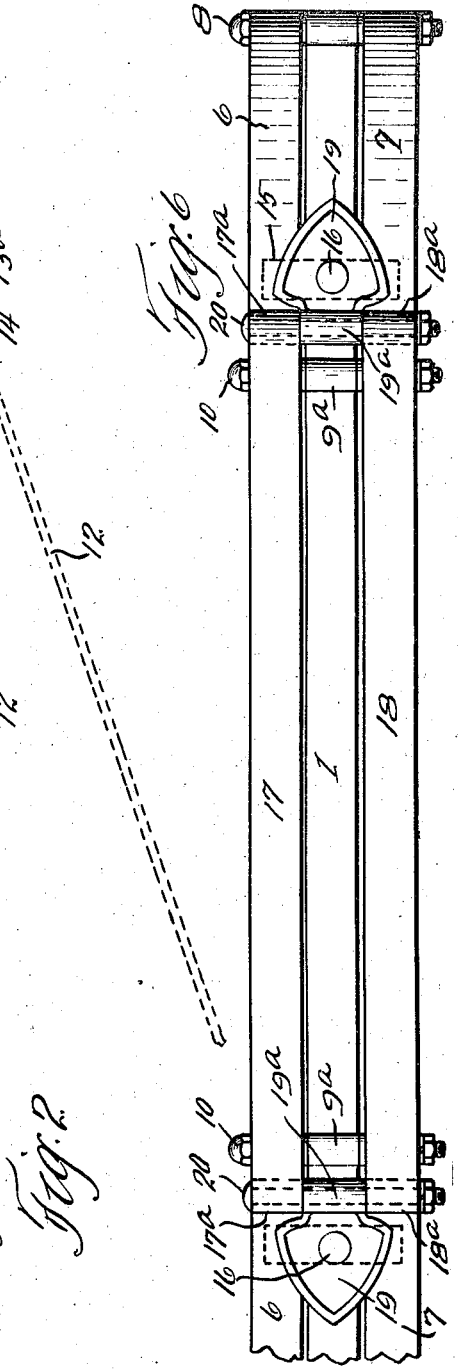
Inventors
Herbert S. Jandus
Harold S. Blydenburgh
By Hull, Cook & West
Attorneys April 5, 1927.
H. S. JANDUS ET AL
1,623,413
BUMPER
Filed July 1, 1926
2 Sheets-Sheet 2
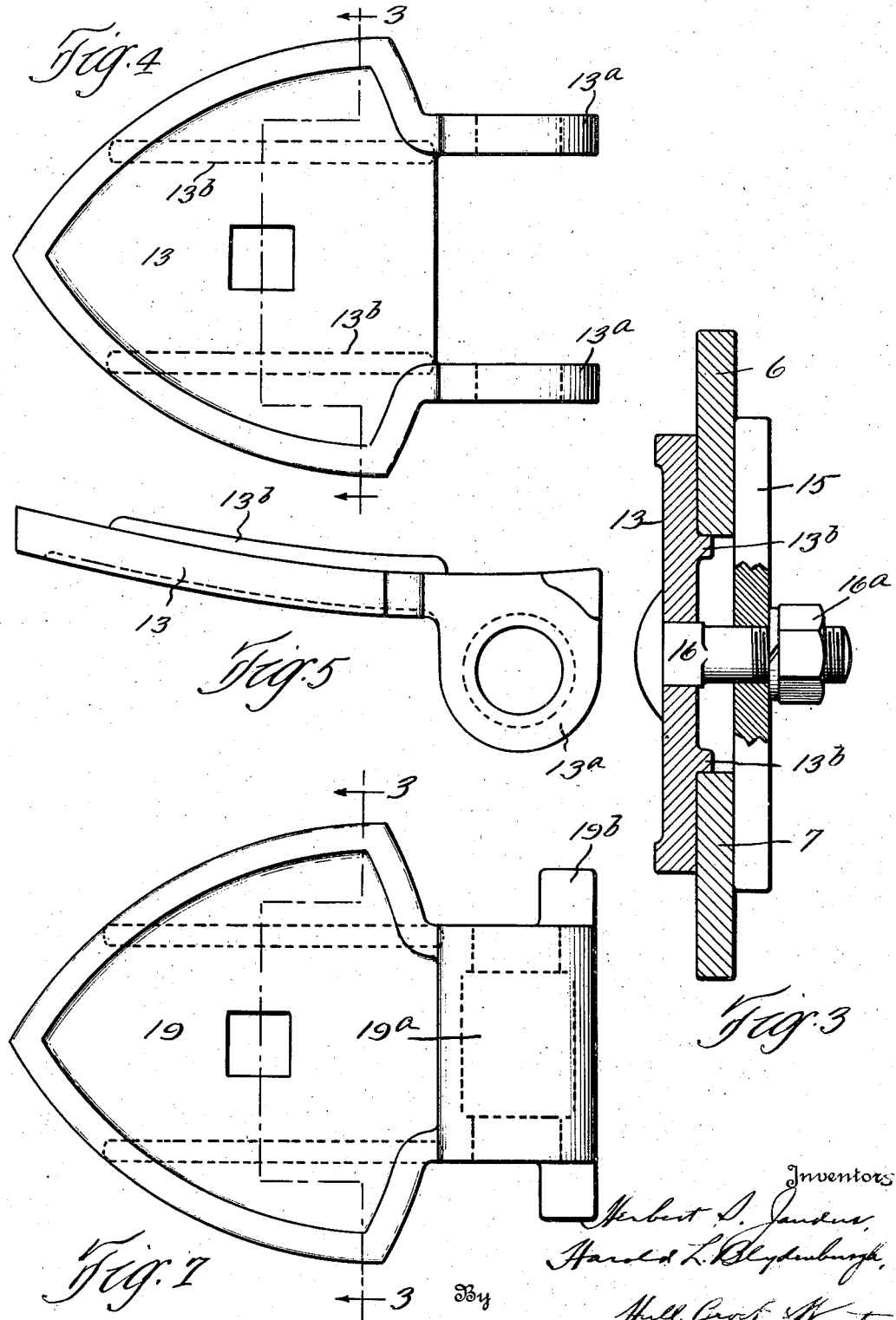

Patented Apr. 5, 1927.

1,623,413

UNITED STATES PATENT OFFICE.

HERBERT S. JANDUS AND HAROLD L. BLYDENBURGH, OF DETROIT, MICHIGAN, ASSIGNORS TO THE C. G. SPRING & BUMPER COMPANY, OF DETROIT, MICHIGAN, A CORPORATION OF DELAWARE.

BUMPER.

Application filed July 1, 1926. Serial No. 119,860.

This invention relates to automobile bumpers and more particularly to bumpers which are adapted to be applied to the rear of automobiles for the protection of the fenders and which are constructed to accommodate and permit the convenient handling of a spare tire. The invention herein is particularly well adapted for use in connection with rear bumpers such as shown in the patent to Christian Girl and Wayne E. Dunston No. 1,476,605, issued December 4, 1923.

It is the general purpose and object of the invention to provide a bumper of the character referred to with a central section which is capable of being conveniently applied to the rear of the fender-guard members and which is so mounted as to enable it to be readily swung out of the way to permit access to the space provided between the said members and to a spare tire within such space.

Further and more limited objects of the invention will appear hereinafter and will be realized in and through the combinations of elements embodied in the claims hereof.

In the drawings Fig. 1 represents an elevation of a bumper embodying our invention; Fig. 2 a plan view of the said bumper, showing parts of its supporting arms; Fig. 3 a detail in section corresponding to the line 3—3 of Fig. 2; Fig. 4 is a detail in elevation and Fig. 5 a detail in plan of one of the rear supporting members for the intermediate bumper section; Fig. 6 a view similar to Fig. 1, showing a modified form of my invention; and Fig. 7 a view similar to Fig. 4 of a modified form of the rear supporting member.

For convenience of description, the bumper will be assumed to be in the position which it occupies when applied to the rear end of an automobile, and the terms "front" and "rear" will be used in furtherance of such convenient designation, but without any intention of necessarily limiting the application of the bumper to any particular part of the vehicle.

Describing the parts by reference characters, 1 denotes a cross bar adapted to extend across the rear of an automobile and the fenders thereof and supported in any convenient manner from the rear ends of the side members of such vehicle, the particular means shown herein being arms 2 extending rearwardly from such side members (not shown) and having their rear ends deflected so as to bear at $2^a$ against the front faces of the front fender-protecting members $1^a$ of the bumper, said members being formed as extensions of and connected by the cross bar 1, the deflected portions $2^a$ being secured to the said members (as well as to the bracing bars, to be referred to hereinafter) by means of bolts 3, arranged above and below the bar 1, and clamping plates 4, $4^a$.

The ends of the members $1^a$ are preferably curved forwardly or toward the vehicle and are provided each with an eye 5.

Associated with the members $1^a$ at each end of the bar 1 are an upper bar 6 and a lower bar 7, each having an eye $6^a$, $7^a$ respectively, which eyes are adapted to receive a bolt 8 extending therethrough and through an eye 5, whereby the bars 6 and 7 are connected to the said members.

The bars 6 and 7 project rearwardly with respect to the members $1^a$ and are then bent slightly forward or toward the cross bar 1, being of sufficient length to extend across and protect the fender adjacent thereto. The inner ends of the bars 6 and 7 are provided with eyes $6^b$, $7^b$, respectively.

9 denotes a pair of bracing bars each having an eye $9^a$ at its rear or outer end which is interposed between the eyes $6^b$ and $7^b$ of the cooperating bars 6 and 7, the bars 6, 7 and 8 being connected by means of bolts 10 extending through such aligned eyes. The front end of each bar 9 is bent outwardly, as shown at $9^b$, whereby it bears against the rear face of an end member $1^a$, and such bent or deflected portion of each of the bars 9 is secured to its cooperating member $1^a$ by means of the bolts 3 and the clamping plates 4, $4^a$, which also serve to connect the arms 2 to the members $1^a$. The space between the fender guard portions 6, 7 and 8 is adapted to receive one or more spare tires, according to the depth of the space, one of such tires being indicated at 11. For the purpose of protecting such tires against impact and of permitting convenient access to such tires and the space therefor, we have provided the bumper just described with a rear central impact section, shown as a single bar 12 in Figs. 1 and 2. The ends of the bar 12 are provided each with an eye $12^a$, which eyes serve to secure the said bar to the fender-guard bars 6 and 7 and enable the bar 12 to form, with such fender-guard bars, a guard for the tire 11, which guard is capable of being swung easily out of the way, from either end thereof, to permit access to the tire, when desired.

Each eye 12$^a$ is detachably connected to and between a pair of rearwardly extending ears 13$^a$ carried by a rear supporting member 13, the eyes and ears being connected by bolts 14 extending therethrough. Each supporting member 13 is preferably curved to conform to the rear faces of the bars 6 and 7 and is of sufficient width to extend across the space between said bars so that the upper and lower ends thereof may bear against said bars. In addition, as will appear from Fig. 3, each supporting member 13 is provided with forwardly extending ribs 13$^b$ having each a shoulder which is adapted to engage respectively the rear of the lower edge of a bar 6 and the rear of the upper edge of a bar 7.

For the purpose of detachably securing the members 13 in place, cooperating members 15 are employed, each of the latter members being in the shape of a metal plate of less width than the space between the bars 6 and 7, but of sufficient length to extend across such space and bear with its upper and lower ends against the front faces of said bars. Each pair of members 13 and 15 is detachably connected by means of a bolt 16 having a head at one end engaging the member 13 and extending through the space between the plates 6 and 7 and through the opposite member 15, the front ends of the bolts being provided with nuts 16$^a$.

With the parts constructed and arranged as described, the complete bumper will comprise end impact sections in the shape of fender guards and a central impact section comprising a bar 12, which central section may be readily attached to and removed from the end sections and which, by merely slacking off either of the nuts 16$^a$ on either of the bolts 16 and turning the appropriate member 15 into register with the space between the bars 6 and 7, may be swung about the other bolt 14 as a pivot, permitting access to the space in front thereof and to a spare tire in such space.

In Figs. 6 and 7 there is shown a modification of the invention wherein the central section comprises a pair of vertically spaced bars, instead of a single bar, and the rear supporting members are changed slightly to accommodate the ends of such bars. In these views, the parts 1—10 are identical with those shown in the preceding views. The upper and lower bars of the central section are shown at 17 and 18, respectively, and each is provided with eyes 17$^a$ and 18$^a$, respectively, at opposite ends thereof. The rear supporting members 19 are of the same construction as the members 13 in the preceding views except for the substitution of an eye 19$^a$ for the ears 13$^a$, each eye having upper and lower vertical projections 19$^b$ which are adapted to engage respectively the lower front edge of a bar 17 and the upper front edge of a bar 18. The bars 17 and 18 will be secured at their ends to the eyes 19$^a$ by bolts 20 extending through the aligned eyes 17$^a$, 18$^a$ and 19$^a$. The front clamping members 15 are preferably identical with those shown in the preceding views, and are connected to the rear and supporting members 19 by bolts 16, as is the case with the other form of our invention.

When the tire-guard or central impact section comprises a pair of vertically spaced bars, as shown in Fig. 6, these bars constitute in effect extensions of the upper and lower fender-guard bars, respectively. In using this form of our invention, by slacking up the nut on one of the bolts 16, the plate 15 may be readily turned to register with the space between the bars 6 and 7, which will enable both bars 17 and 18 and the supporting members 15 and 19 attached to one end thereof to be swung about the bolt 20, at the opposite ends of the bars 17 and 18, as a pivot.

Having thus described our invention, what we claim is:—

1. The combination, with a pair of fender guards each comprising a bar adapted to extend across and protect a fender, of a supporting member secured to and projecting rearwardly from the inner portion of each such bar, and a central bumper section extending across the space between the said fender guards and having its opposite ends pivotally connected to the said supporting members and at the rear of the said fender guards.

2. The combination, with a pair of fender guards each comprising a bar adapted to extend across and protect a fender, of a supporting member secured to each fender guard bar adjacent to the inner end thereof, a central bumper section extending across the space between the said guards and having an eye at one end thereof, means pivotally connecting the said eye to one of the said members, and means for detachably connecting the other end of said section to the other supporting member.

3. The combination, with a pair of fender guards each comprising a bar adapted to extend across and protect a fender, of a supporting member secured to each fender guard bar adjacent the inner end thereof, a central bumper section extending across the space between the said guards and having an eye at each end thereof, and means pivotally connecting the said eyes to the said members.

4. The combination, with a pair of fender guards each comprising a bar adapted to extend across and protect a fender, of a supporting member secured to each fender guard bar, adjacent to the inner end thereof, one of said members having a pair of vertically spaced ears, a central bumper section extending across the space between the said fender guards and having an eye at an end thereof, a bolt connecting the said eye with the said ears, and means detachably connecting the other end of said section to the other supporting member.

5. The combination, with a pair of fender guards each comprising a bar adapted to extend across and protect a fender, of a bumper supporting member secured to each of said bars and adjacent to the inner end thereof, each of said members having a pair of vertically spaced ears, a central bumper section extending across the space between the said fender guards and having an eye at each end thereof and bolts connecting the eyes of such central section with the ears of the respective supporting members.

6. The combination, with a pair of fender guards each comprising a pair of vertically spaced bars adapted to extend across and protect a fender, of a supporting member adapted to extend across the space between each pair of fender guard bars and to bear against the rear faces of said bars, means for detachably securing the said members to the said fender guard bars, a central bumper section adapted to extend across the space between the said fender guards, and means for pivotally connecting the opposite ends of the said section to the said supporting members.

7. The combination, with a pair of fender guards each comprising a pair of vertically spaced bars adapted to extend across and protect a fender, of a supporting member adapted to extend across the space between each pair of fender guard bars and to bear against the rear faces of said bars, means for detachably securing one of the said members to the said fender guard bars, a central bumper section adapted to extend across the space between the said fender guards, means connecting one end of said section to the last-mentioned member, and means for pivotally connecting the opposite end of the said section to the other supporting member.

8. The combination, with a pair of fender guards each comprising a pair of vertically spaced bars adapted to extend across and protect a fender, of a central bumper section adapted to extend across the space between the said guards, means pivotally supporting one end of said section from a pair of said bars, a supporting member to which the other end of said section is secured, and means for detachably securing the said supporting member to the other pair of fender guards.

9. The combination, with a pair of fender guards each comprising a bar adapted to extend across and protect a fender, of a central bumper section adapted to extend across the space between the said guards, means pivotally supporting one end of said section from one of said bars, a supporting member to which the other end of said section is secured, and means for detachably securing the said supporting member to the other of said bars.

10. The combination, with a pair of fender guards each comprising a pair of vertically spaced bars adapted to extend across and protect a fender, of a supporting member adapted to bear against the rear faces of each pair of fender guard bars adjacent to the inner ends thereof, a plate of less width than the distance between each pair of fender guard bars and adapted to extend across the front faces of each pair of such bars, bolts connecting the said plates and members, and a central bumper section extending across the space between the fender guards and having its opposite ends pivotally connected to the said supporting members.

11. The combination, with a pair of fender guards each comprising a pair of vertically spaced bars adapted to extend across and protect a fender, of a pair of supports each comprising a member adapted to engage the rear faces of a pair of fender guard bars, a cooperating member adapted to engage the front faces of a pair of such bars, and means detachably connecting the said members to their respective fender guards, and a central bumper section adapted to extend across the space between the fender guards and having its ends connected to the said supports, one of such connections being a pivotal connection.

12. The combination, with a pair of fender guards each comprising a pair of vertically spaced bars adapted to extend across and protect a fender, of a pair of supports each comprising a member adapted to extend across the space between a pair of fender-guard bars and to engage the rear faces of said bars and provided with seats adapted to engage respectively the lower edge of the upper bar and the upper edge of the lower bar of such pair of fender guard bars, each support also comprising a front member adapted to extend across the space between a pair of fender guard bars and to engage the front faces of said bars, bolts connecting the front and back members of each support, and a central bumper section adapted to extend across the space between the fender guards and having its ends pivotally connected to the rear members of the said supports.

13. The combination, with a pair of fender guards each comprising a pair of vertically spaced bars adapted to extend across and protect a fender, of a support comprising a member adapted to extend across the space between a pair of fender guard bars and to engage the rear faces of said bars and provided with seats adapted to engage respectively the lower edge of the upper bar and the upper edge of the lower bar of such pair of fender guard bars, said support also comprising a front member adapted to extend across the space between the pair of fender guard bars and to engage the front faces of said bars, bolts connecting the front and back members of such support, a central bumper section adapted to extend across the space between the fender guards and having one end pivotally connected to the rear member of the said support, and means pivotally supporting the opposite end of said section from the other pair of fender guard bars.

In testimony whereof, we hereunto affix our signatures.

HERBERT S. JANDUS.
HAROLD L. BLYDENBURGH.